United States Patent
Zeitak

(12) 
(10) Patent No.: US 7,779,155 B2
(45) Date of Patent: Aug. 17, 2010

(54) METHOD AND SYSTEMS FOR RESOURCE BUNDLING IN A COMMUNICATIONS NETWORK

(75) Inventor: Reuven Zeitak, Rehovot (IL)

(73) Assignee: Alcatel, Paris (FR)

( * ) Notice: Subject to any disclaimer, the term of this patent is extended or adjusted under 35 U.S.C. 154(b) by 1072 days.

(21) Appl. No.: 10/585,447

(22) PCT Filed: Aug. 29, 2004

(86) PCT No.: PCT/IL2004/000781

§ 371 (c)(1),
(2), (4) Date: Jul. 7, 2006

(87) PCT Pub. No.: WO2005/066829

PCT Pub. Date: Jul. 21, 2005

(65) Prior Publication Data

US 2009/0193144 A1    Jul. 30, 2009

(51) Int. Cl.
G06F 15/173    (2006.01)

(52) U.S. Cl. .................... 709/240; 709/232; 370/230.1

(58) Field of Classification Search ................ 709/235, 709/240, 232; 370/229, 252, 395.21, 336, 370/468, 395.2, 230.1
See application file for complete search history.

(56) References Cited

U.S. PATENT DOCUMENTS

| | | | |
|---|---|---|---|
| 5,511,066 A | | 4/1996 | Witters et al. |
| 5,541,913 A | | 7/1996 | Witters et al. |
| 6,072,989 A | | 6/2000 | Witters et al. |
| 6,104,700 A | | 8/2000 | Haddock et al. |
| 6,614,790 B1 | * | 9/2003 | Veres et al. .............. 370/395.2 |
| 6,643,260 B1 | | 11/2003 | Kloth et al. |
| 7,577,161 B2 | * | 8/2009 | Li et al. ...................... 370/468 |
| 2002/0071387 A1 | * | 6/2002 | Horiguchi et al. ........... 370/229 |
| 2002/0087713 A1 | * | 7/2002 | Cunningham ............... 709/235 |
| 2002/0186661 A1 | * | 12/2002 | Santiago et al. ............. 370/252 |
| 2002/0194369 A1 | | 12/2002 | Rawlins et al. |
| 2003/0214928 A1 | * | 11/2003 | Chuah ........................ 370/336 |
| 2004/0028054 A1 | * | 2/2004 | Khurana et al. ........ 370/395.21 |

\* cited by examiner

*Primary Examiner* — Jungwon Chang
(74) *Attorney, Agent, or Firm* — Carmen Patti Law Group, LLC

(57) ABSTRACT

A method for resource bundling comprises receiving at a network policer (110) a plurality of data flows having different class of service (CoS) priority levels and processing the data flows while sharing a user allocated bandwidth between the different CoS priority levels in a prioritized manner. The method and a system implementing it allow a single user to aggregate multiple CoS, thereby enabling the user to utilize an entire paid-for bandwidth.

23 Claims, 6 Drawing Sheets

METHOD AND SYSTEMS FOR RESOURCE BUNDLING IN A COMMUNICATIONS NETWORK

FIELD OF THE INVENTION

The present invention relates generally to communication networks, and more particularly to systems and methods for policing data traffic in communication networks.

BACKGROUND OF THE INVENTION

Modern communication networks are more diverse and bandwidth-intensive than ever before. High-bandwidth communication networks are frequently required when a user needs to transmit a data flow. Data flows are data packets or service frames that have been analyzed for the purpose of determining, among others: the process flow to which they belong, the way the packets should be processed and the destination to which a packet should be routed. An exemplary process flow may be a series of packets, all belonging to the signaling of a file transfer protocol (FTP). Often the data flow includes data of different priority, ranging from high priority data, e.g., voice communications, which cannot tolerate significant delays, to low priority data, e.g., file transfers.

Access to a communication network is typically facilitated by a service provider, which maintains equipment at nodes on the network. Generally, service providers supply access to the network for multiple users. A user can access the network with multiple data flows. In order to secure sufficient bandwidth, users often contract for discrete channels, each channel capable of handling the greatest expected bandwidth requirement of a respective data flow. Often, these channels utilize only a small fraction of the maximum allocated bandwidth. As a result, a user either pays for potential bandwidth and uses only a fraction thereof, or takes advantage and uses bandwidth at rates beyond what was actually paid for. In order to enable users to pay only for utilized bandwidth, service providers limit the transmission rate. Means for limiting and controlling the traffic are even more essential in a network employing a non-deterministic access protocol, such as an Ethernet network or a metro Ethernet network (MEN).

Typically, service providers offer a user a range of services that are differentiated based on some performance characteristics, such as delays and packet losses. Specifically, a user purchases a service package that assures a certain level of service level, usually referred to as quality of service (QoS). A service package is determined by a bandwidth profile and a class of service (CoS). The bandwidth profile is a set of traffic parameters that govern the expected arrival pattern of user traffic and provide a deterministic upper bound or an envelope to the expected volume of traffic. The bandwidth traffic parameters are: committed information rate (CIR), committed burst size (CBS), excess information rate (EIR), and excess burst size (EBS). The CoS defines the treatment inside the provider network, i.e., the level of delay requirement. For example, a packet with a high priority level (or simply "high-priority") CoS may be forwarded at the highest priority to assure minimum processing delay.

The traffic management is performed by the policing function implemented in a device (hereinafter the "policer"), of a network access node. The policer enforces the rate on each incoming data flow or a set of data flows as designated in the service package and as characterized by the bandwidth. The first step in rate enforcement is to determine the level of conformance of the incoming data flow. The level of conformance is typically expressed as one of three colors: green, yellow, or red, where green packets are transmitted at a rate equal to the CBS, yellow packets are transmitted at a rate equal to file EBS, and red packets are not transmitted.

One of the algorithms used to compute the level of conformance of incoming data flows is the token bucket rate algorithm (TBRA). For each incoming flow, the TBRA determines whether to accept or reject the flow. A flow is accepted if its length is less than the bucket content $B_j$ at time $t_j$; otherwise, the flow is rejected. The bucket content at time $t_j$ is calculated using the equation:

$$B_j = [L, B_{j-1} + R \times (t_j - t_{j-1})]; \quad (1)$$

here L is the bucket length (i.e., the burst size), and R is the rate. The parameters (L, R) can be replaced by the parameters (CBS, CIR) or (EBS, EIR) and therefore the TBRA can be used to determine the level of conformance for "green packets" and "yellow packets". Different algorithms based on the principle described in the TBRA may be found in prior art. These include for example "three color marker", "leaky bucket", "adaptive leaky bucket", "one bucket-two colors", are just to name a few.

At present, policers are not designed to share the available bandwidth according to the CoS. Specifically, the bandwidth can be shared either among an aggregation of data flows with different CoS, or among a set of data flows with the same CoS. In the former case, data flow is served on a basis of "first comes first served", whereas in the latter case, the policer assures for each CoS a constant rate, as defined by the CIR. However, in both cases a policer can neither serve more than one data flow and more than one CoS, nor share the bandwidth efficiently between different levels of CoS. Examples for policing methods and devices may be found in U.S. Pat. Nos. 5,511,066, 5,541,913 and 6,072,989 to Witters et al, U.S. Pat. No. 6,104,700 to Haddock et al, and U.S. Pat. No. 6,646,988 to Nandy et al, and in U.S. patent application Ser. No. 10/095,909 to Rawlins et al.

Therefore, in the view of the limitations introduced in the prior art, it would be advantageous to provide a policer that handles multiple classes of service and multiple data flows. It would be further advantageous if such a policer shares the bandwidth allocated to a single user in a prioritized manner.

SUMMARY OF THE INVENTION

The present invention discloses a network policing unit that can handle multiple classes of service and multiple data flows, while sharing the bandwidth allocated to a single user in a prioritized manner, as well as methods for resource bundling using the policing unit and policers incorporated in it. The methods disclosed herein may be applied to a plurality of classes of service of a plurality of different data flows, and facilitate sharing of an available bandwidth among the data flows in a prioritized manner. They allow a single user to aggregate multiple CoS, hence enabling a low priority CoS to consume bandwidth when a high priority CoS is idle. This ensures that a user utilizes the entire bandwidth paid for. That is, the bandwidth is not shared among other users when the high priority CoS data flow of a user is idle. In other words, paid-for bandwidth is first used for lower priority packets of the paying user rather than being utilized by high priority packets of another user who does not pay for the additional bandwidth that may be needed.

According to the present invention there is provided, in a communication network, a method for resource bundling comprising the steps of: receiving, at a network policer, a plurality of data flows having different class of service (CoS)

priority levels, the data flows associated with a single user having an allocated bandwidth; processing the data flows while sharing the allocated bandwidth between the different CoS priority levels in a prioritized manner, and forwarding the processed data flows to the communications network.

According to one feature in the method for resource bundling mentioned above, each data flow includes at least one packet of a respective CoS priority level, each such packet having a packet length, wherein the step of processing includes, for each packet, sub-steps of providing a threshold associated with each CoS, calculating a tentative credit value for the packet, and forming a forwarding decision based on a comparison between the tentative credit value and the threshold associated will the CoS.

According to the present invention there is provided, in a second embodiment, a method for resource bundling in a communications network comprising the steps of: at a network policer dedicated to a user, receiving a plurality of data flows comprising a plurality of data packets having corresponding packets lengths, the data flows belonging to at least two different class of service (CoS) priority levels; performing a prioritized conformance test for each data packet to accept or reject the data packet; and responsive to the conformance test, further processing each data packet.

According to a feature in the second embodiment of the method for resource bundling in a communications network, the step of processing includes, for accepted data packets, forwarding all the accepted data packets regardless of their respective CoS priority level to the communications network, and for rejected data packets, forwarding the rejected data packet to a lower level network policer for further processing.

According to the present invention there is provided a system operative to bundle resources in a communications network comprising: a plurality of network policers dedicated to a user, each policer operative to share a plurality data flows bandwidth allocated to the user in a prioritized manner, wherein the data flows belong to a plurality of different class of service (CoS) priority levels; and a corresponding plurality of coloring units, each coloring unit coupled to a respective network policer and used to color data packets of the data flows processed in the respective policer, whereby the system allows the single user to aggregate multiple CoS, hence enabling a low priority CoS to consume bandwidth when a high priority CoS is idle.

DETAILED DESCRIPTION OF THE PREFERRED EMBODIMENTS

The present invention provides methods and a system for resource bundling in networking systems. The method described herein is capable of handling multiple data flows. The system is a policing unit (PU) involving a plurality of cascaded policers. Data flows are data packets, or service frames that have been analyzed for the purpose of determining the process flow to which they belong, how the packets should be processed, where the packet should be routed, and so on. For example, a process flow may be a series of packets all belonging to the signaling of a file transfer protocol (FTP).

Figure 1:
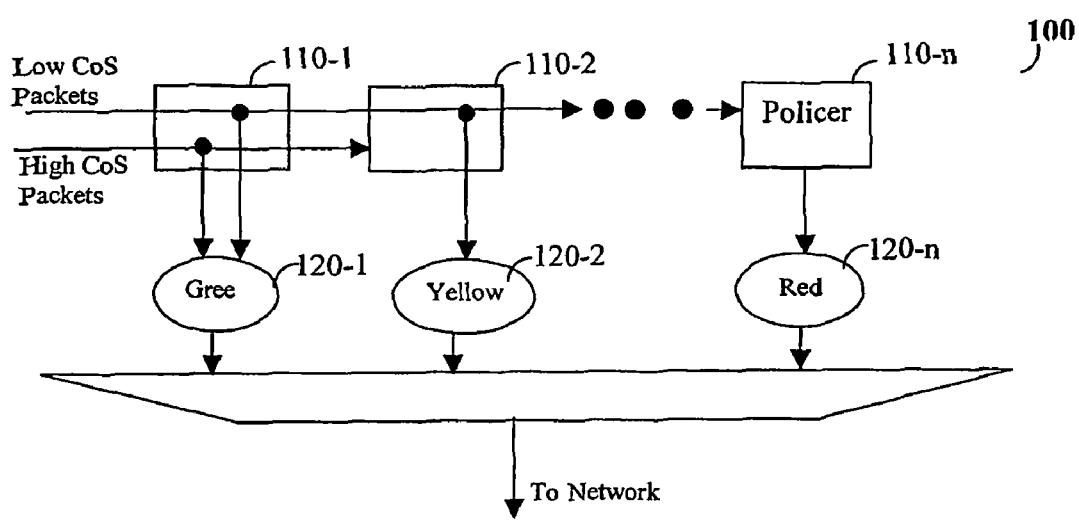
FIG. 1 is an exemplary diagram of a policing unit for the purpose of illustrating the principles of the present invention.

Reference is now made to FIG. 1, which shows an exemplary diagram of a policing unit 100 allocated per user for the purpose of illustrating the principles of the present invention. PU 100 includes 'n' policers 110-1 through 110-n connected in a cascade connection. A policer 110 is parameterized by the pairs (CIR, CBS) or (EIR, EBS). For each policer 110 a coloring unit (CU) 120 is attached. Each CU 120 marks the packets with a different color as preconfigured by the service provider. For example, data packets passing through policer 110-1 are marked by a CU 120-1 in green, packets passing through policer 110-2 are marked by a CU 120-2 in yellow, while packets passing through policer 110-n are marked by a CU 120-n in red. Policer 110 includes a plurality of thresholds (see FIGS. 2, 3), where each threshold defines the allowed burst size for a CoS priority level. For each received data packet, policer 110 performs a conformance check to determine whether to accept or reject an incoming packet. The decision to accept or reject is based on a preconfigured threshold as well as the available bandwidth, as described in greater detail below. As seen in FIG. 1, policer 110-1 car accept or reject packets with a high priority CoS or a low priority CoS. High priority CoS packets have priority over low priority CoS packets regardless of the amount of available bandwidth. Packets accepted by policer 110-1 are colored in green, while packets rejected by policer 110-1 are forwarded to policer 110-2, which handles only lower priority CoS packets. In this example, rejected high priority packets are discarded.

A policer 110 includes various configurable parameters. The configurable parameters include, but are not limited to, the CoS priority levels to be handled by the policer, the thresholds, the colors to mark accepted packets, CIR, CBS, EIR, EBS, and others. This allows a service provider to define and offer a plurality of different service packages for different users. For example, a client may purchase a service package of 10 Mbps of CIR and 4 KB of CBS for high priority CoS, as well as 5 Mbps of EIR for low priority CoS. The service package may include the rule that when flows of the high priory CoS are inactive, flows of the low priority CoS may also use the CIR with a burst less than 2 KB. For such a service package, the service provider configures the low priority threshold to the value of 2 KB and the high priority thresholds to the value of 6 KB (i.e., the 4 KB requested as a minimum for the high priority CoS plus the 2 KB for the low priority CoS).

Figure 2:
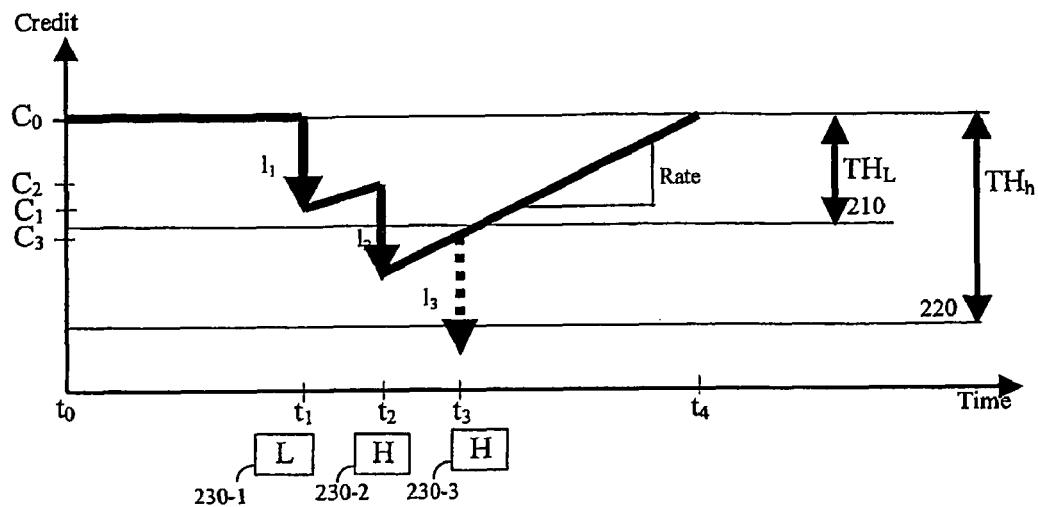
FIG. 2 is a time diagram illustrating the operation of a policer according to the present invention.

Reference is now made to FIG. 2, which shows a time diagram illustrating the operation of a policer according to the present invention. The policer includes two threshold levels 210 and 220. While the operation of the policer is discussed for only two thresholds, this is performed for exemplary purposes only, and multiple threshold levels may be used as may be necessary for the particular application. Thresholds 210 and 220 define a permitted burst size for a low priority CoS and a high priority CoS respectively. At time $t_0$, the policer has enough credit value ($C_0$, equal to the maximum permitted burst size (MPBS)) to accept either a high priority packet (a packet with a high priority CoS) or a low priority packet, as long as the length of the incoming packet is smaller than the $C_0$. Specifically, an available credit value $C_j$ at time $t_j$ can be calculated using the equation:

$$C_j = \min[CBS, C_{j-1} + CIR \times (t_j - t_{j-1})]. \quad (2)$$

The credit value, the length of a packet, and the burst size are typically measured in bytes.

A packet length is tolerated between a maximum length and a minimum length as defined by the protocol type. At time $t_1$, a low priority packet 230-1 with length $l_1$ is received. Since $l_1$ is smaller than the permitted burst size defined for a low-level threshold ($TH_L$) of threshold 210 (i.e. $l_1 < TH_L$), packet 230-1 is accepted by policer 110-1 (FIG. 1). As a result, the credit value at time $t_1$ ($C_1$) is set to be the value of the credit value of time $t_0$ ($C_0$) minus the length $l_1$. At time $t_2$, a high priority packet 230-2 with length $l_2$ is received. As the value of the credit at time $t_2$ ($C_2$) minus $l_2$ does not exceed a permitted burst size defined for a high level threshold ($TH_h$) of threshold 220 (i.e., $C_2 - l_2 < TH_h$), packet 230-2 is accepted. As a result, the credit value is set to the value $C_2 - l_2$. At time $t_3$, a high priority packet with length $l_3$ is received. The credit value at time $t_3$ ($C_3$) minus $l_3$ exceeds threshold 220 (i.e., $C_3 - l_3 > TH_h$) and therefore packet 230-3 is rejected. The credit value increases as a function of the rate, i.e. CIR or EIR, see e.g. equation (2).

Figure 3A:
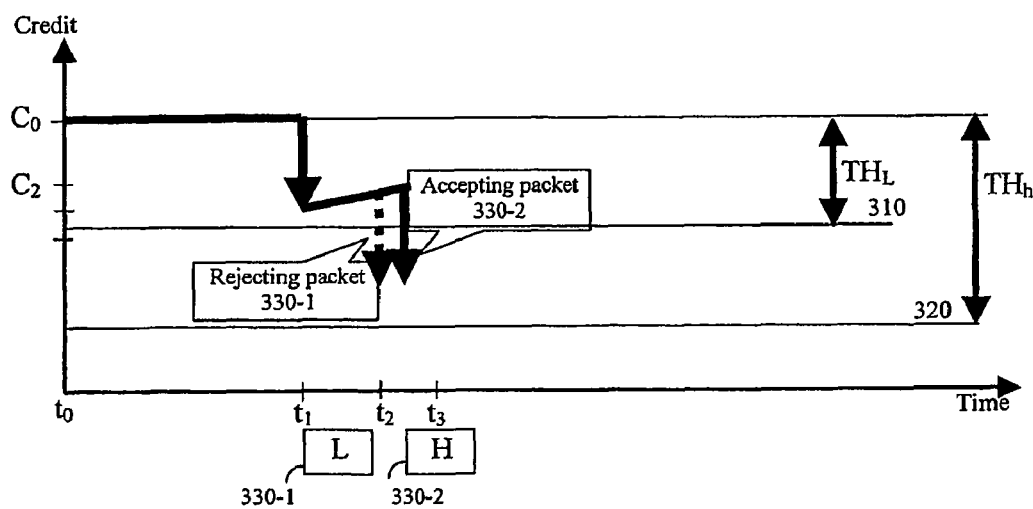
FIG. 3 shows three (a, b, c) time diagrams illustrating one of the capabilities of a policer according to the present invention.
Figure 3B:
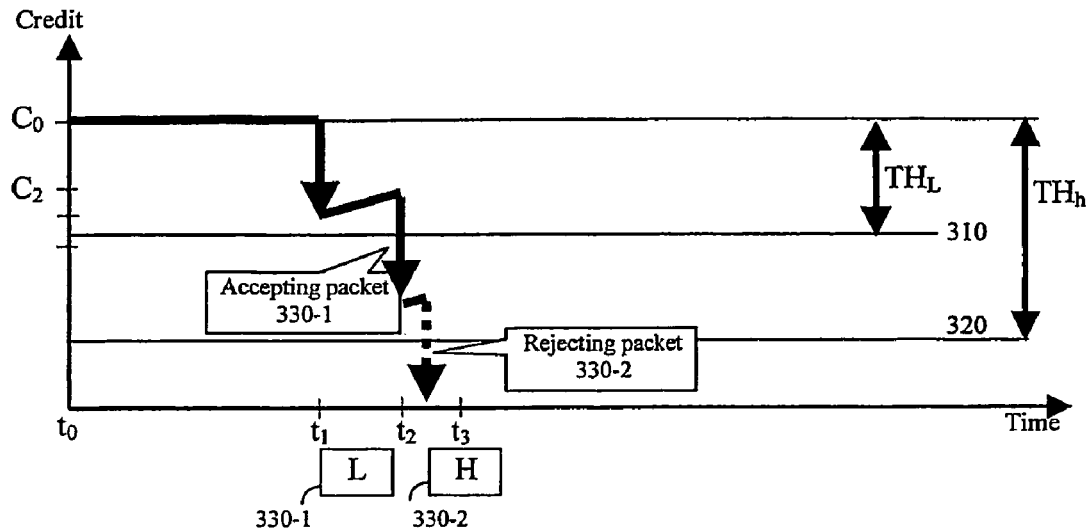

Reference is now made to FIG. 3A, which shows a time diagram demonstrating one of the capabilities of a policer to protect high priority CoS data flows against flooding from low priority CoS data flows in accordance with the present invention. At time $t_2$ a low priority packet 330-1 with length $l_1$ is received. The credit value at time $t_2$ ($C_2$) minus the length of packet 330-1 ($l_1$) exceeds a low-level threshold 310 (i.e., $C_2 - l_1 > TH_L$), and for that reason packet 330-1 is rejected. Subsequently, a high priority packet 330-2 having length $l_2$, is received. Due to the fact that the value of the current credit ($C_2$) minus $l_2$ does not exceed a high level threshold 320 (i.e. $C_2 - l_2 < TH_h$), packet 330-2 is accepted. As can be seen in FIG. 3B, acceptance of packet 330-1 would have caused rejection of packet 330-2, since there is not enough bandwidth to serve both packets.

Figure 3C:
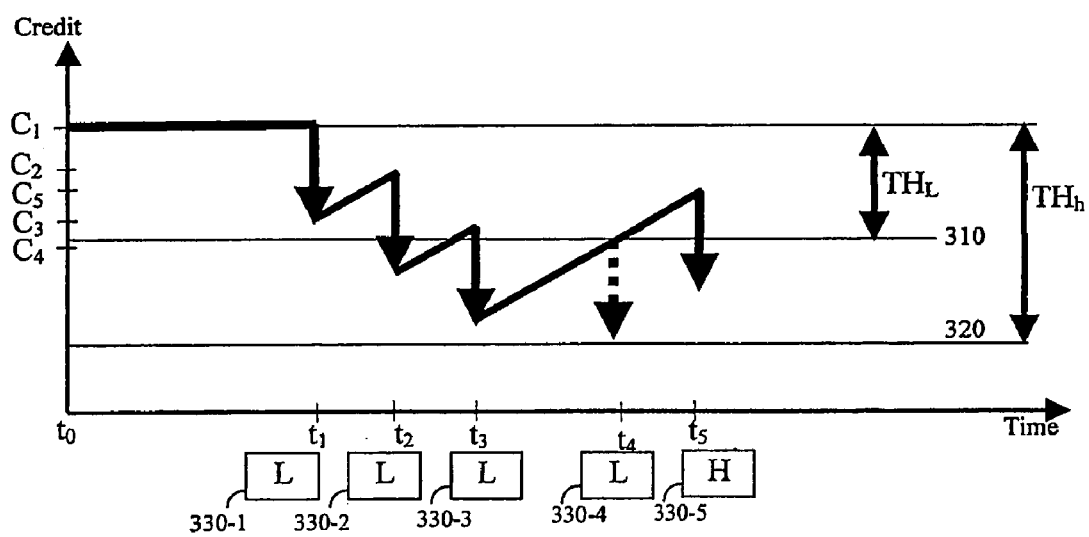

Referring now to FIG. 3C, which shows another example for the operation of a policer according to the present invention. Four consecutive data packets 330-1, 330-2, 330-3, and 330-4, all belonging to a low priority data flow, arrive at the policer between time $t_0$ to time $t_4$. The lengths of data packets 330-1, 330-2, 330-3, and 330-4 are $l_1$, $l_2$, $l_3$, and $l_4$ respectively. At time $t_1$, packet 330-1 is accepted, since the credit value at time $t_1$ ($C_1$) minus its length ($l_1$) does not exceed low-level threshold 310 (i.e., $C_1 - l_1 < TH_L$). At time $t_2$, packet 330-2 is accepted, although the credit value at time $t_2$ ($C_2$) minus its length ($l_2$) exceeds low-level threshold 310 (i.e. $C_2 - l_2 > TH_L$). Packet 330-3 is accepted, since a sequence of low priority packets are received immediately after packet 330-2. Hence, this allows a user to consume the entire bandwidth paid for when high priority flow is not transmitted, i.e., when no high priority packets are received. For the same reason, at time $t_3$, packet 330-3 is accepted, although the credit value at time $t_3$ ($C_3$) minus its length ($l_3$) exceeds low-level threshold 310. At time $t_4$, packet 330-4 is rejected to leave enough bandwidth for a high priority packet 310-5 that arrives at a later time $t_5$. This is performed in order to eliminate the acceptance of the low priority flows in favor of high priority flows. At time $t_5$, packet 330-5 is accepted, since the credit value at time $t_5$ ($C_5$) minus the length of packet 330-5 ($l_5$) does not exceed high-level threshold 320 (i.e., $C_5 - l_5 < TH_h$).

As can be understood from the exemplary cases described above, the use of multiple thresholds allows the sharing of bandwidth allocated to a single user in a prioritized manner. Furthermore, as a policer 110 is allocated per user, a single user may aggregate multiple CoS and thus allow low priority data flows to consume bandwidth allocated for high priority data flows, when such high priority flows are not transmitted, but which bandwidth was paid for anyway. This is in contrast with prior art solutions in which unused bandwidth allocated for high priority flows is shared among other users. That is, a policer 110 is designed to provide resource bundling.

Figure 4:
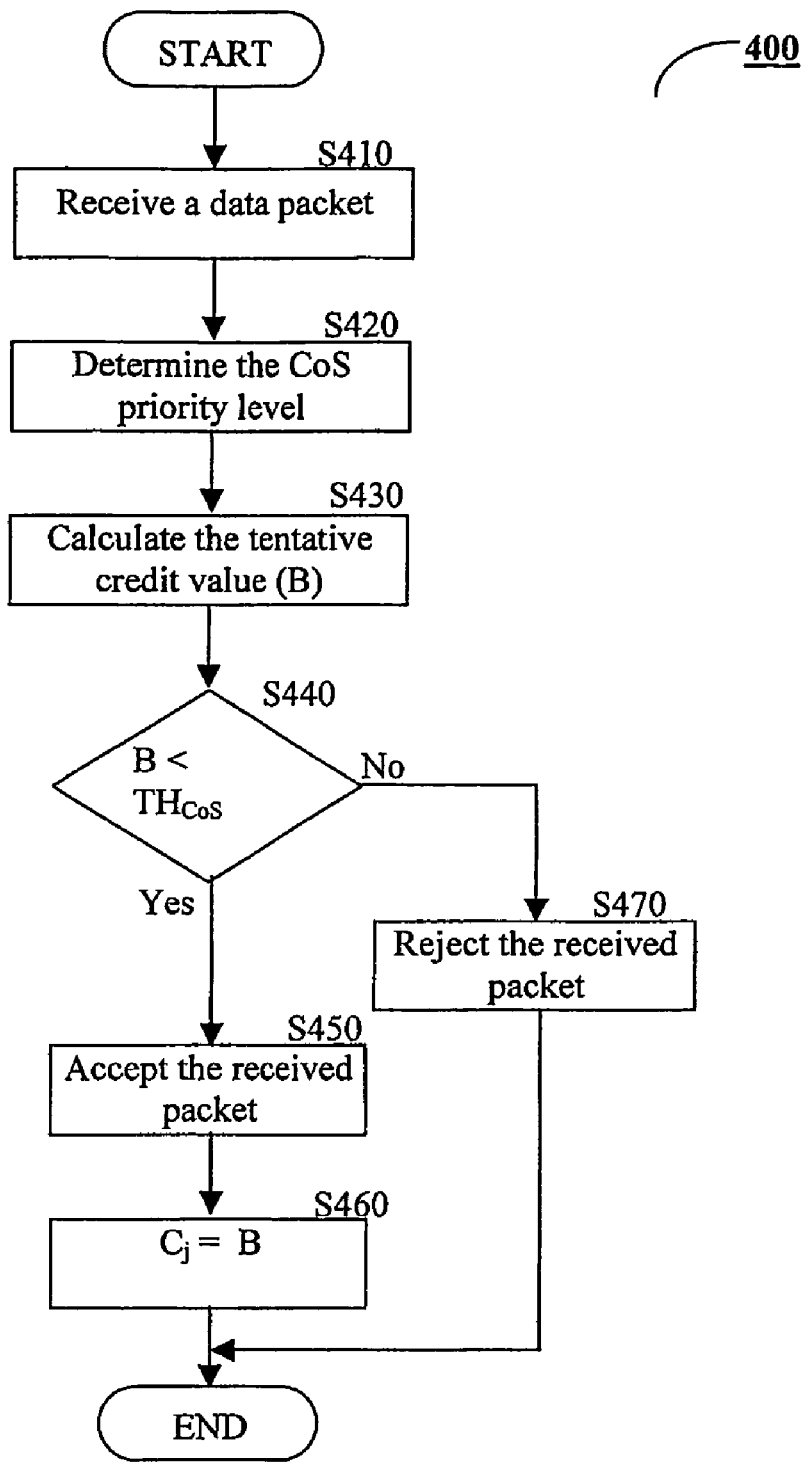
FIG. 4 is an exemplary embodiment of an algorithm used for policing data flows according to the present invention.

Reference is now made to FIG. 4, which shows an exemplary embodiment of an algorithm 400 used for policing data flows in accordance with this invention. At step S410, a packet 'j' with a length $l_j$ is received. At step S420, the incoming packet is analyzed to determine the CoS priority level of the packet. The CoS priority level is designated in the packet's header. At step S430, a tentative credit value ("B") is calculated for packet 'j' arriving at time $t_j$. The tentative credit value determines the remaining credit after accepting an incoming packet. The tentative credit value is calculated using the following equation:

$$B = C_j - l_j; \quad (3)$$

where $C_j$ is the available credit at time $t_j$. The value of $C_j$ is preferably calculated using equation (2). At step S440 the tentative credit value is compared against a CoS threshold ($TH_{CoS}$) corresponding to the CoS priority level of the incoming packet. If the value of the tentative credit value is lower than the threshold value (i.e. if $B < TH_{CoS}$), then, at step S450, the packet is accepted; otherwise, at step S470, the packet is rejected. As a result of accepting the packet, at step S460 the credit $C_j$ is set to the value of the tentative credit value. A rejected packet can be forwarded to another policer of a lower level, or alternatively it may be dropped.

Figure 5:
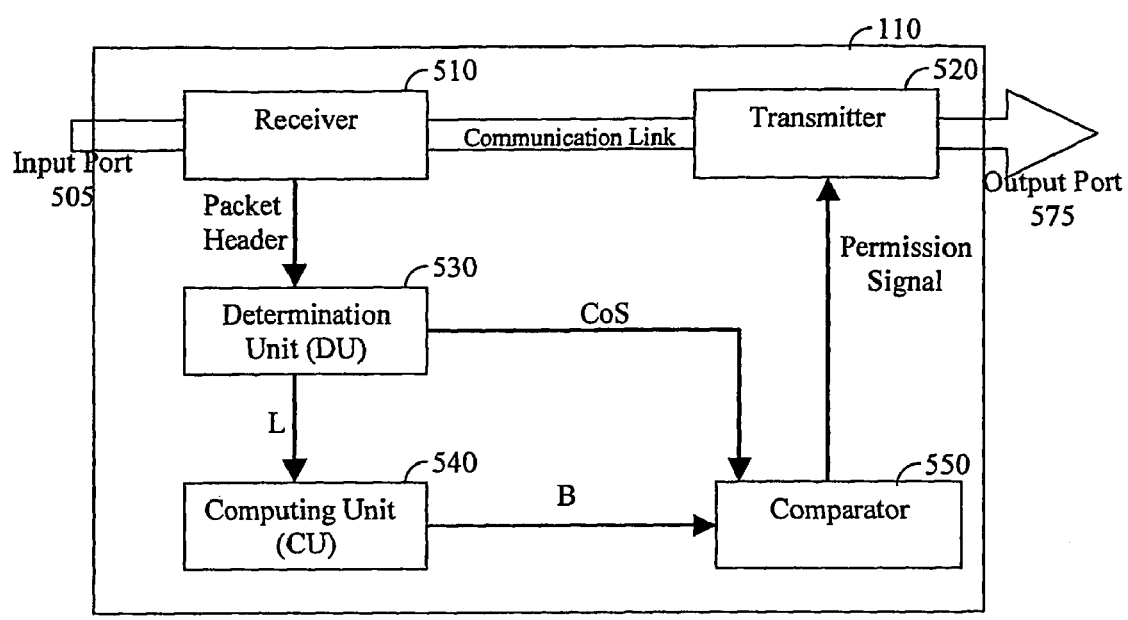
FIG. 5 is a non-limiting block diagram of a policer according to the present invention.

The disclosed method can be implemented in software (computer code) using a computing machine. The software could be in any type of computing language in any level. The techniques could also be implemented using a combination of hardware and software. Computer program products (including Internet downloads) that include the software for implementing the disclosed techniques form part of the disclosed teachings. Reference is now made to FIG. 5, which shows a non-limiting block diagram of a policer 110. Policer 110 preferably comprises an input port 505 and an output port 575. Policer 110 further includes a receiver 510, a transmitter 520, a determination unit (DU) 530, a computing unit (CU) 540, and a comparator 550. Input port 505 and output port 575 may be, but are not limited to, 10 Mbp, 100 Mbps, 1 Gbps, and 10 Gps Ethernet ports. Input and output ports are both coupled to a common communication link (not shown). Receiver 510 is coupled to input port 505 and to DU 530, which in turn is coupled to CU 540. CU 540 is further coupled to comparator 550, which is further coupled to transmitter 520.

Receiver 510 receives through input port 505 the incoming data packets being transported over the common communication link. Upon reception of a data packet, receiver 510 provides the information of the header part of this data packet to DU 530. DU 530 determines, from the received header information, the CoS priority level and the length of the incoming packet DU 530 provides comparator 550 with the CoS priority level information and CU 540 with the packet length l. CU 540 computes the tentative credit value (B), using for example equation (3), and provides comparator 550 with the result. Comparator 550 executes a conformance check according to the predefined threshold and the CoS priority level of the packet. Comparator 550 determines if the calculated tentative credit value (B) exceeds the predefined threshold, and if it does, the packet is rejected; otherwise, the packet is accepted. In the event that comparator 550 declares the received packet as accepted, the packet can be transmitted on the communication link. As a result, comparator 550 forwards a permission signal to the transmitter 520, which subsequently transmits the packet on the communication link. If the received packet is rejected, then the packet is not transmitted on the communication link, and can be either discarded or forwarded to another policer.

It should be appreciated by a person skilled in the art that the components of a policer 110 described herein may be hardware components, firmware components, software components, or a combination thereof.

In an embodiment of this invention, policer 110 may be included in a metro Ethernet network on the user-network interface (UNI) using a standard 10 Mbp, 100 Mbps, 1 Gbps, 10 Gps Ethernet interface. In a metro Ethernet network, policer 110 may carry out all the activities related to Ethernet traffic management as described in greater detail above.

Figure 6:
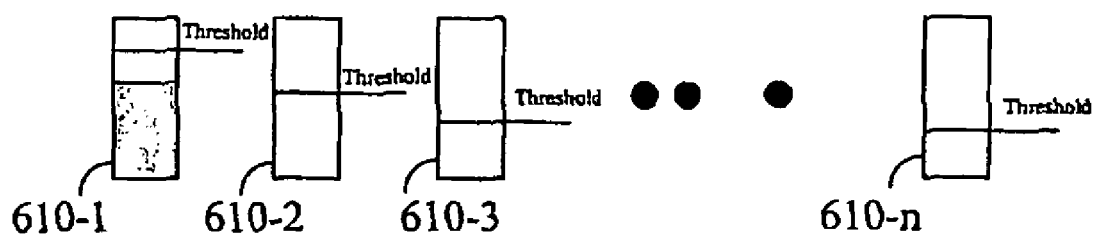
FIG. 6 is another exemplary embodiment of an algorithm for policing data flows according to the present invention.

Reference is now made to FIG. 6, which shows another exemplary embodiment of an algorithm for policing data flows according to the present invention. FIG. 6 shows a set of 'n' counters 610-1 through 610-n included in a policer (e.g., policer 110). Each of counters 610 serves a different priority level of CoS. A counter 610-i counts at a rate proportional to the committed rate (i.e. the CIR) until the threshold of that rate is reached. Once the threshold is reached, a next counter 610-i+1 starts to accumulate credit. Specifically, when a packet arrives its length is compared to the amount of available credit in counters 610 and the packet is deemed conforming or non-conforming based on a preprogrammed rule. As a non-limiting example, a packet with a CoS priority level 'j' is accepted if the following rule is obeyed:

$$l > CC_j + CC_{j+1} + \ldots + CC_n \qquad (4)$$

where l is the length of the packet and $CC_i$ is the amount of credit in counter 610-i. The CoS priority levels of counter 610-1 through 610-n are $CoS_j$ through $CoS_n$ respectively, where $CoS_1$ is the highest priority and $CoS_n$ is the lowest priority. After which, the counters are depleted, starting with $CC_n$ until a credit with a total length 'l' has been removed.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for resource bundling in a communication network, said method comprising the steps of:
   a) receiving, at a network policer dedicated to a single user, a plurality of data flows having different class of service (CoS) priority levels, wherein said plurality of data flows comprise a plurality of data packets, said data flows associated with said single user having an allocated bandwidth;
   b) processing said data flows by performing for each data packet of said plurality of data packets a prioritized conformance test to accept or reject said data packet thereby sharing said allocated bandwidth between said different CoS priority levels in a prioritized manner; and
   c) responsive to said conformance test, further processing each said data packet and forwarding said processed data flows to the communications network.

2. The method of claim 1, wherein each said data flow includes at least one data packet of a respective CoS priority level, said at least one data packet having a data packet length, and wherein said step of processing further comprises, for each said data packet, the steps of:
   i. providing a threshold associated with each said CoS priority level;
   ii. calculating a tentative credit value for said data packet; and,
   iii. forming a forwarding decision based on a comparison between said tentative credit value and said threshold associated with said CoS priority level.

3. The method of claim 2, wherein said forming a forwarding decision step further comprises the steps of accepting said data packet if said tentative credit value is lower than a CoS threshold, and rejecting said data packet if said tentative credit value exceeds said CoS threshold.

4. The method of claim 2, wherein said providing a threshold associated with each said CoS step further comprises the step of providing a CoS threshold that defines a permitted burst size for said CoS priority level.

5. The method of claim 2, wherein said providing a threshold associated with each said CoS step further comprises the step of providing a threshold that has a configurable value.

6. The method of claim 2, wherein said calculating a tentative credit value step further comprises the step of deducting said data packet length from an available credit value.

7. The method of claim 6, wherein said available credit value for a data packet received at a time $t_j$ is calculated using the formula $C_j = \min [CBS, C_{j-1} + CIR \times (t_j - t_{j-1})]$, and wherein said CBS is a committed burst size, and wherein said CIR is a committed information rate.

8. The method of claim 6, wherein the step of accepting said data packet further includes comprises the steps of:
   A. setting said tentative credit value to equal said available credit value;
   B. marking said data packet with a color tag that defines a permitted rate for said data packet; and,
   C. transmitting said color tagged data packet on the network.

9. The method of claim 8, wherein said transmitting said color tagged packet on the network step further comprises the step of transmitting said color tagged packet on a network selected from the group consisting of an Ethernet network and a metro Ethernet network.

10. The method of claim 1, wherein said step of processing further comprises the step of processing said data flows using a computer implemented code.

11. The method of claim 1, wherein said step of further processing each said data packet further comprises the steps of:
   i. for accepted data packets of said plurality, forwarding all said accepted data packets regardless of their respective CoS priority level to the communications network; and
   ii. for rejected data packets of said plurality, forwarding said rejected data packet to a lower level network policer for further processing.

12. The method of claim 1, wherein said network policer is operable to allow low priority data flows to consume unused bandwidth allocated for high priority data flows.

13. An apparatus for resource bundling in a communication network, comprising:
- a network policer dedicated to a single user, said network policer being operable to receive a plurality of data flows having different class of service (CoS) priority levels, wherein said plurality of data flows comprise a plurality of data packets, and wherein said data flows associated with said single user have an allocated bandwidth; and
- wherein said network policer is operable to perform for each data packet of said plurality of data packets a prioritized conformance test to accept or reject said data packet thereby sharing said allocated bandwidth between said different CoS priority levels in a prioritized manner; and
- wherein said network policer is operable to process, in response to said conformance test, each said data packet and forward said processed data flows to the communications network.

14. The apparatus of claim 13, wherein each said data flow includes at least one data packet of a respective CoS priority level, said at least one data packet having a data packet length, and wherein, for each said data packet, said network policer is operable to:
  i. provide a threshold associated with each said CoS priority level;
  ii. calculate a tentative credit value for said data packet; and,
  iii. form a forwarding decision based on a comparison between said tentative credit value and said threshold associated with said CoS priority level.

15. The apparatus of claim 14, wherein said network policer is operable to accept said data packet if said tentative credit value is lower than a CoS threshold, and reject said data packet if said tentative credit value exceeds said CoS threshold.

16. The apparatus of claim 14, wherein said network policer is operable to provide a CoS threshold that defines a permitted burst size for said CoS priority level.

17. The apparatus of claim 14, wherein said network policer is operable to provide a threshold that has a configurable value.

18. The apparatus of claim 14, wherein said network policer is operable to deduct said data packet length from an available credit value.

19. The apparatus of claim 18, wherein said available credit value for a data packet received at a time $t_j$ is calculated using the formula $C_j = \min[CBS, C_{j-1} + CIR \times (t_j - t_{j-1})]$, and wherein said CBS is a committed burst size, and wherein said CIR is a committed information rate.

20. The apparatus of claim 18, wherein said network policer is operable to:
  A. set said tentative credit value to equal said available credit value;
  B. mark said data packet with a color tag that defines a permitted rate for said data packet; and
  C. transmit said color tagged data packet on the network.

21. The apparatus of claim 20, wherein said network policer is operable to transmit said color tagged packet on a network selected from the group consisting of an Ethernet network and a metro Ethernet network.

22. The apparatus of claim 13, wherein said network policer is operable to process said data flows using a computer implemented code.

23. The apparatus of claim 13, wherein said network policer is operable to:
  i. forward all said accepted data packets regardless of their respective CoS priority level to the communications network for accepted data packets of said plurality; and
  ii. forward said rejected data packet to a lower level network policer for further processing for rejected data packets of said plurality.

* * * * *